US012674061B2

(12) United States Patent
Fam et al.

(10) Patent No.: US 12,674,061 B2
(45) Date of Patent: Jul. 7, 2026

(54) PAINT COMPOSITION

(71) Applicant: FLAME SECURITY INTERNATIONAL PTY LTD, Kensington (AU)

(72) Inventors: Winny Fam, Kensington (AU); Arslan Khalid, Kensington (AU)

(73) Assignee: Flame Security International Pty Ltd., Kensington (AU)

( * ) Notice: Subject to any disclaimer, the term of this patent is extended or adjusted under 35 U.S.C. 154(b) by 0 days.

(21) Appl. No.: 18/533,038

(22) Filed: Dec. 7, 2023

(65) Prior Publication Data

US 2024/0117200 A1 Apr. 11, 2024

Related U.S. Application Data

(63) Continuation of application No. PCT/AU2023/050963, filed on Oct. 5, 2023.

(30) Foreign Application Priority Data

Oct. 7, 2022 (AU) ................................ 2022902920

(51) Int. Cl.
*C09D 5/18* (2006.01)
*C09D 5/02* (2006.01)
(Continued)

(52) U.S. Cl.
CPC ............. *C09D 5/185* (2013.01); *C09D 5/021* (2013.01); *C09D 7/61* (2018.01); *C09D 7/63* (2018.01);
(Continued)

(58) Field of Classification Search
None
See application file for complete search history.

(56) References Cited

U.S. PATENT DOCUMENTS 3,707,385 A * 12/1972 Kraemer et al. ....... C09D 5/185
106/18.25
4,240,974 A * 12/1980 Little ..................... C07C 46/06
558/57
(Continued)

FOREIGN PATENT DOCUMENTS

CA 27778180 A1 * 12/2012
CN 105419106 A * 3/2016 ............. C08L 23/12
(Continued)

OTHER PUBLICATIONS

Chuang et al., Impact of the Intumescent Formulation of Styrene Acrylic-based Coatings on the Fire Performance of Thin Painted Red Lauan (*Parashorea* Spp.) Plywood, European Journal of Wood and Wood Products, vol. 67, May 2, 2009, pp. 407-415.
(Continued)

*Primary Examiner* — Tamra L. Dicus
(74) *Attorney, Agent, or Firm* — Kilpatrick Townsend & Stockton LLP

(57) ABSTRACT

Fire retardant paint compositions comprising polymeric binders derived from vinyl ester monomer, polyphosphate salts, nitrogen containing blowing agents, and charring agents are provided. When applied to substrates the paint compositions form durable coatings useful in protecting the substrates from fire.

18 Claims, 5 Drawing Sheets

(51) Int. Cl.

| | |
|---|---|
| *C09D 7/40* | (2018.01) |
| *C09D 7/61* | (2018.01) |
| *C09D 7/63* | (2018.01) |
| *C09D 123/08* | (2006.01) |
| *C09D 131/04* | (2006.01) |
| *C09D 135/02* | (2006.01) |

(52) U.S. Cl.
CPC ......... *C09D 7/69* (2018.01); *C09D 123/0869* (2013.01); *C09D 131/04* (2013.01); *C09D 135/02* (2013.01)

(56) References Cited

U.S. PATENT DOCUMENTS

| | | | | |
|---|---|---|---|---|
| 2015/0004402 | A1* | 1/2015 | Tarkin-Tas | C09D 4/06 |
| | | | | 521/85 |
| 2016/0222296 | A1* | 8/2016 | Eskind | C09K 21/10 |
| 2017/0355844 | A1 | 12/2017 | Kalsani et al. | |
| 2019/0345346 | A1 | 11/2019 | Peskens et al. | |
| 2020/0369963 | A1* | 11/2020 | Cha | C09K 21/10 |
| 2021/0095102 | A1* | 4/2021 | Fox | C08K 3/32 |
| 2021/0156060 | A1* | 5/2021 | Pyun | D04H 1/64 |
| 2021/0179864 | A1 | 6/2021 | Khan et al. | |
| 2021/0340384 | A1* | 11/2021 | Price | C09D 7/65 |
| 2021/0394490 | A1* | 12/2021 | Brunet | C09D 5/185 |
| 2023/0002622 | A1* | 1/2023 | Canterbury | C09K 21/02 |
| 2023/0279240 | A1* | 9/2023 | Price | C09D 7/61 |
| | | | | 106/18.16 |
| 2024/0042734 | A1* | 2/2024 | Cui | B32B 21/04 |

FOREIGN PATENT DOCUMENTS

| | | | | |
|---|---|---|---|---|
| EP | 3945118 | A1 | 2/2022 | |
| KR | 20190066360 | A * | 6/2019 | |
| WO | WO-2018063578 | A1 * | 4/2018 | ............ B32B 27/08 |
| WO | 2021046280 | A1 | 3/2021 | |
| WO | 2022171489 | A1 | 8/2022 | |

OTHER PUBLICATIONS

Duquesne, Influence of Inorganic Fillers on the Fire Protection of Intumescent Coatings, Journal of Fire Sciences, vol. 31, No. 3, 2012, pp. 258-275.

International Patent Application No. PCT/AU2023/050963, International Search Report and Written Opinion, mailed on Oct. 31, 2023, 11 pages.

Daus, et al. "A chain is no stronger than its weakest link: Weathering resistance of water-based intumescent coatings for steel applications," Journal of Fire Sciences, 2021, vol. 39(1) 72-102.

\* cited by examiner

Heat Release Rate of 19mm-Thick Coated Timber at 35 kW/$m^2$

Total Heat Release Rate of 19mm-Thick Coated Timber at 35 kW/$m^2$ (a)

(b)

(a)

(b)

(a)

(b)

PAINT COMPOSITION

CROSS-REFERENCE TO RELATED APPLICATIONS

The present application is a continuation of PCT Application No.: PCT/AU2023/050963, filed Oct. 5, 2023, which claims priority to AU2022902920, filed Oct. 7, 2022, each of which is hereby incorporated by reference in its entirety.

FIELD OF THE DISCLOSURE

The present disclosure relates to fire retardant paint compositions and coatings. The paint compositions provide durable coatings on substrates and when exposed to heat or flame undergo charring which protects the substrate from oxygen and radiant heat attack. The paint compositions and coatings find particular, although not exclusive, use in protecting interior timber or plasterboard.

BACKGROUND OF THE DISCLOSURE

Fire retardant coatings act in a fire to insulate the substrate thereby extending the time before the substrate is damaged by fire. These coatings are often in the form of water-based paint compositions that are applied to the substrate, for example by brushing or spraying.

Such paint compositions may have intumescent properties such that they react to heat by swelling, producing a carbonaceous char that acts as an insulating layer to protect the substrate.

A recent study (Daus, L-H, et al, J. Fire Sciences, 2021, 39(1), pp 72-102) examined a common intumescent coating containing ammonium polyphosphate, pentaerythritol, melamine and polyvinyl acetate, and variants thereof. The ammonium polyphosphate serves as a source of phosphoric acid which reacts with pentaerythritol forming a cross-linked char network. Melamine acts as blowing agent and at a certain temperature releases non-flammable gases that swell the char. The polyvinyl acetate acts as a polymeric binder to bind the components together and also provides adhesion to the substrate. Titanium dioxide is also added as an inorganic component to enhance the temperature stability of the char through the formation of titanium pyrophosphate. In the study, numerous alternatives to the aforementioned components were examined and an effort made to progress understanding of the complex system. However, the study was limited to fixed compositions containing 11 wt. % polymeric binder and 67 wt. % of a combination of ammonium polyphosphate, melamine and pentaerythritol, and variants thereof, which equates to a weight ratio of these three components to polymeric binder of about 6:1.

Fire retardant coatings desirably should have good adhesion to the substrate and further should be durable over months or years after application.

However, in view of the complexity of the compositions it is difficult, if not impossible, to predict performance in terms of strength of adhesion, long term durability, and, ultimately, fire protection.

Despite the foregoing advances, there remains a need for alternative fire retardant paint compositions and coatings derived therefrom.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE DISCLOSURE

In one aspect the present disclosure provides a fire retardant paint composition comprising:
- a) about 8 to about 20 wt. % of one or more polymeric binders derived from vinyl ester monomer;
- b) about 15 to about 35 wt. % of one or more polyphosphate salts;
- c) about 20 to about 40 wt. % water;
- d) about 5 to about 15 wt. % of one or more nitrogen containing blowing agents; and
- e) about 5 to about 15 wt. % of one or more charring agents;

based on the total weight percent of the paint composition.

In some preferred embodiments, the one or more polymeric binders derived from vinyl ester monomer is a vinyl acetate, ethylene, vinyl ester terpolymer. The vinyl ester monomer is a different vinyl ester monomer to vinyl acetate.

In embodiments the fire retardant paint composition comprises:
- a) about 10 to about 18 wt. % of one or more polymeric binders derived from vinyl ester monomer;
- b) about 20 to about 30 wt. % of one or more polyphosphate salts;
- c) about 25 to about 35 wt. % water;
- d) about 5 to about 15 wt. % of one or more nitrogen containing blowing agents; and
- e) about 5 to about 15 wt. % of one or more charring agents;

based on the total weight percent of the paint composition.

In some preferred embodiments, the one or more polymeric binders derived from vinyl ester monomer is a vinyl acetate, ethylene, vinyl ester terpolymer. The vinyl ester monomer is a different vinyl ester monomer to vinyl acetate.

In embodiments, the fire retardant paint composition further comprises one or more inorganic fillers in an amount from about 3 to about 15 wt. %, based on the total weight percent of the paint composition.

In embodiments, the fire retardant paint composition further comprises one or more char strengthening enhancers in an amount from about 0.5 to about 5 wt. %, based on the total weight percent of the paint composition.

In embodiments, the weight ratio of the sum of polyphosphate salt, nitrogen containing blowing agent, and charring agent, to polymeric binder in the fire retardant paint composition is less than 6, or less than about 5, or less than about 4.

In embodiments, the weight ratio of the sum of polyphosphate salt, nitrogen containing blowing agent, and charring agent, to polymeric binder in the fire retardant paint composition is from less than 6 to about 2, or from about 5 to about 2, or from about 4.5, to about 2, or from about 4 to about 2.

In embodiments, the weight ratio of polymeric binder to one or more inorganic fillers is greater than 1, or greater than 1.5, or greater than 2.

In embodiments, the weight ratio of polymeric binder to one or more inorganic fillers is from about 1 to about 3, or from about 1.5 to about 2.5.

In embodiments, the fire retardant paint composition further comprises one or more auxiliaries selected from UV resistance additives, dispersing agents, biocides, wetting agents, defoamers, coalescents, and thickeners.

In embodiments, the one or more polymeric binders derived from vinyl ester monomer is an ethylene vinyl ester copolymer or an acrylic vinyl ester copolymer In embodiments, the vinyl ester monomer comprises vinyl acetate monomer.

In some preferred embodiments, the one or more polymeric binders derived from vinyl ester monomer is a vinyl acetate, ethylene, vinyl ester terpolymer. The vinyl ester monomer is a different vinyl ester monomer to vinyl acetate.

In embodiments, the one or more polyphosphate salts comprise one or more of alkali metal polyphosphate, ammonium polyphosphate and melamine polyphosphate.

In embodiments, the one or more polyphosphate salts has a solubility in water of less than about 2 wt. %, or less than about 1 wt. %, or less than about 0.5 wt. % at 20° C.

In embodiments, the one or more polyphosphate salts comprises a particulate polyphosphate having an average particle size (D50) of about 5 to about 50 micron, or about 10 to about 30 micron.

In embodiments, the one or more nitrogen containing blowing agents decompose at a temperature from about 250° C. to about 400° C.

In embodiments, the one or more nitrogen containing blowing agents comprises melamine, urea, melamine cyanurate, dicyandiamide, guanidine and glycine.

In embodiments, the one or more charring agents comprise one or more polyols.

In embodiments, the one or more polyols comprise one or more of glycerol, pentaerythritol, and dipentaerythritol.

In embodiments, the one or more polyols comprise dipentaerythritol.

In embodiments, the one or more inorganic fillers comprise one or more of titanium dioxide, zinc oxide, aluminium hydroxide, magnesium hydroxide, silica, silicates, and calcium carbonate.

In embodiments, the one or more inorganic fillers comprise titanium dioxide.

In embodiments, the one or more char strengthening enhancers comprise one or more of rockwool, glass fibre, carbon fibre, silicon carbide fibre, carbon nanotubes, and halloysite nanotubes.

In some preferred embodiments, the fire retardant paint composition of the present disclosure comprises:

a) about 8 to about 20 wt. % of one or more polymeric binders comprising a vinyl acetate, ethylene, vinyl ester terpolymer;

b) about 15 to about 35 wt. % of one or more polyphosphate salts;

c) about 20 to about 40 wt. % water;

d) about 5 to about 15 wt. % of melamine; and e) about 5 to about 15 wt. % of dipentaerythritol;

based on the total weight percent of the paint composition.

In other preferred embodiments the fire retardant paint composition comprises:

a) about 10 to about 18 wt. % of one or more polymeric binders comprising a vinyl acetate, ethylene, vinyl ester terpolymer;

b) about 20 to about 30 wt. % of one or more polyphosphate salts;

c) about 25 to about 35 wt. % water;

d) about 5 to about 15 wt. % of melamine; and e) about 5 to about 15 wt. % of dipentaerythritol;

based on the total weight percent of the paint composition.

In another aspect the present disclosure provides a fire retardant coating, wherein the coating comprises:

a) about 12 to about 30 wt. % of one or more polymeric binders derived from vinyl ester monomer;

b) about 20 to about 50 wt. % of one or more polyphosphate salts;

c) about 5 to about 20 wt. % of one or more nitrogen containing blowing agents; and d) about 5 to about 20 wt. % of one or more charring agents;

based on the total weight percent of the coating.

In some preferred embodiments, the one or more polymeric binders derived from vinyl ester monomer is a vinyl acetate, ethylene, vinyl ester terpolymer. The vinyl ester monomer is a different vinyl ester monomer to vinyl acetate.

In embodiments, the fire retardant coating comprises:

a) about 15 to about 25 wt. % of one or more polymeric binders derived from vinyl acetate monomer;

b) about 30 to about 40 wt. % of one or more polyphosphate salts;

c) about 8 to about 18 wt. % of one or more nitrogen containing blowing agents; and d) about 8 to about 18 wt. % of one or more charring agents;

based on the total weight percent of the coating.

In some preferred embodiments, the one or more polymeric binders derived from vinyl ester monomer is a vinyl acetate, ethylene, vinyl ester terpolymer. The vinyl ester monomer is a different vinyl ester monomer to vinyl acetate.

In embodiments, the fire retardant coating further comprises one or more inorganic fillers in an amount from about 3 to about 15 wt. %, based on the total weight percent of the coating.

In embodiments, the fire retardant coating further comprises one or more char strengthening enhancers in an amount from about 0.5 to about 5 wt. %, based on the total weight percent of the coating.

In embodiments, the weight ratio of the sum of polyphosphate salt, nitrogen containing blowing agent, and charring agent, to polymeric binder in the fire retardant coating is less than 6, or less than about 5, or less than about 4.

In embodiments, the weight ratio of the sum of polyphosphate salt, nitrogen containing blowing agent, and charring agent, to polymeric binder in the fire retardant coating is from less than 6 to about 2, or from about 5 to about 2, or from about 4.5 to about 2, or from about 4 to about 2.

In embodiments, the weight ratio of polymeric binder to one or more inorganic fillers is greater than 1, or greater than 1.5, or greater than 2.

In embodiments, the weight ratio of polymeric binder to one or more inorganic fillers is from about 1 to about 3, or from about 1.5 to about 2.5.

In embodiments, the fire retardant paint coating further comprises one or more auxiliaries selected from UV resistance additives, dispersing agents, biocides, wetting agents, defoamers, coalescents, and thickeners.

In embodiments, the one or more polymeric binders derived from vinyl ester monomer is an ethylene vinyl ester copolymer or an acrylic vinyl ester copolymer In embodiments, the vinyl ester monomer comprises vinyl acetate monomer.

In some preferred embodiments, the one or more polymeric binders derived from vinyl ester monomer is a vinyl acetate, ethylene, vinyl ester terpolymer. The vinyl ester monomer is a different vinyl ester monomer to vinyl acetate.

Fire retardant coatings according to the present disclosure comprising one or more polymeric binders comprising vinyl acetate, ethylene, vinyl ester terpolymers perform particularly well when exposed to fire, displaying high levels of char expansion, excellent substrate adhesion and resistance to weathering.

In embodiments, the one or more polyphosphate salts comprise one or more of alkali metal polyphosphate, ammonium polyphosphate and melamine polyphosphate.

In embodiments, the one or more polyphosphate salts has a solubility in water of less than about 2 wt. %, or less than about 1 wt. %, or less than about 0.5 wt. % at 20° C.

In embodiments, the one or more polyphosphate salts comprise a particulate polyphosphate having an average particle size (D50) of about 5 to about 50 micron, or about 10 to about 30 micron.

In embodiments, the one or more nitrogen containing blowing agents decompose at a temperature from about 250° C. to about 400° C.

In embodiments, the one or more nitrogen containing blowing agents comprises melamine, urea, melamine cyanurate, dicyandiamide, guanidine and glycine.

In embodiments, the one or more charring agents comprise one or more polyols.

In embodiments, the one or more polyols comprise one or more of glycerol, pentaerythritol, and dipentaerythritol.

In embodiments, the one or more polyols comprise dipentaerythritol.

In embodiments, the one or more inorganic fillers comprise one or more of titanium dioxide, zinc oxide, aluminium hydroxide, magnesium hydroxide, silica, silicates, and calcium carbonate.

In embodiments, the one or more inorganic fillers comprise titanium dioxide.

In embodiments, the one or more char strengthening enhancers comprise one or more of rockwool, glass fibre, carbon fibre, silicon carbide fibre, carbon nanotubes, and halloysite nanotubes.

In some preferred embodiments, the fire retardant coating of the present disclosure comprises:
   a) about 15 to about 25 wt. % of one or more polymeric binders comprising a vinyl acetate, ethylene, vinyl ester terpolymer;
   b) about 30 to about 40 wt. % of one or more polyphosphate salts;
   c) about 8 to about 18 wt. % of melamine; and
   d) about 8 to about 18 wt. % of dipentaerythritol;
based on the total weight percent of the coating.

In other preferred embodiments, the fire retardant coating of the present disclosure comprises:
   a) about 12 to about 30 wt. % of one or more polymeric binders comprising a vinyl acetate, ethylene, vinyl ester terpolymer;
   b) about 20 to about 50 wt. % of one or more polyphosphate salts;
   c) about 5 to about 20 wt. % of melamine; and
   d) about 5 to about 20 wt. % of dipentaerythritol;
based on the total weight percent of the coating.

In another aspect the present disclosure provides a method of protecting a substrate against fire comprising the step of applying the fire retardant paint composition according to any one of the herein disclosed embodiments to the substrate.

In embodiments, the applying comprises brushing or spraying.

In another aspect the present disclosure provides the use of the fire retardant paint composition according to any one of the herein disclosed embodiments, or the fire retardant coating according to any one of the herein disclosed embodiments, in protecting a substrate against fire.

In embodiments, the substrate comprises timber, preferably interior timber.

In embodiments, the substrate comprises plasterboard.

In another aspect the present disclosure provides a coated substrate comprising the fire retardant coating according to any one of the herein disclosed embodiments.

In embodiments, the coating has a thickness from about 0.2 mm to about 3 mm, or from about 0.5 mm to about 2 mm, or from about 0.2 mm to about 1 mm.

In embodiments, the adhesion strength of the coating to the substrate is greater than 0.5 MPa, or greater than 0.6 MPa, or greater than 0.7 MPa, for a coating thickness of 0.5 mm.

In embodiments, the weight ratio of the sum of polyphosphate salt, nitrogen containing blowing agent, and charring agent, to polymeric binder in the fire retardant coating is less than 6, or less than about 5, or less than about 4.

In embodiments, the weight ratio of the sum of polyphosphate salt, nitrogen containing blowing agent, and charring agent, to polymeric binder in the fire retardant coating is from less than 6 to about 2, or from about 5 to about 2, or from about 4.5 to about 2, or from about 4 to about 2.

In embodiments, the weight ratio of polymeric binder to one or more inorganic fillers is greater than 1, or greater than 1.5, or greater than 2.

In embodiments, the weight ratio of polymeric binder to one or more inorganic fillers is from about 1 to about 3, or from about 1.5 to about 2.5.

In embodiments, the coated substrate according to any one of the herein disclosed embodiments, said coated substrate comprising a fire retardant coating of thickness 0.5 mm, affords a maximum heat release as measured according to AS3837 of less than 100 kW/m$^2$, when the coated substrate is exposed to an irradiance level of 35 kW/m$^2$.

In embodiments, the coated substrate according to any one of the herein disclosed embodiments, said coated substrate comprising a fire retardant coating of thickness 0.5 mm, affords a maximum heat release as measured according to AS3837 of less than 50 kW/m$^2$, when the coated substrate is exposed to an irradiance level of 35 kW/m$^2$.

In embodiments, the coated substrate according to any one of the herein disclosed embodiments, said coated substrate comprising a fire retardant coating of thickness 0.5 mm, affords a maximum heat release as measured according to AS3837 of less than 10 kW/m$^2$, when the coated substrate is exposed to an irradiance level of 35 kW/m$^2$.

Advantages of the presently disclosed fire retardant paint compositions include one or more of the following:
   they possess excellent adhesion to a variety of substrates;
   they provide excellent protection to a substrate against fire; and
   they possess long term durability.

It is surprising that the fire retardant paint compositions and fire retardant coatings of the present disclosure, which contain relatively high levels of polymeric binder, and therefore, relatively low levels of fire retardant components (ammonium polyphosphate, nitrogen containing blowing agent, and charring agent) can usefully protect a substrate from fire.

Any embodiment herein shall be taken to apply mutatis mutandis to any other embodiment unless specifically stated otherwise.

The present disclosure is not to be limited in scope by the specific embodiments described herein, which are intended for the purpose of exemplification only. Functionally-equivalent products, compositions and processes are clearly within the scope of the disclosure, as described herein.

Further aspects of the present disclosure and further embodiments of the aspects described in the preceding paragraphs will become apparent from the following description, given by way of example and with reference to the accompanying drawings.

DETAILED DESCRIPTION OF THE EMBODIMENTS

Figure 1:
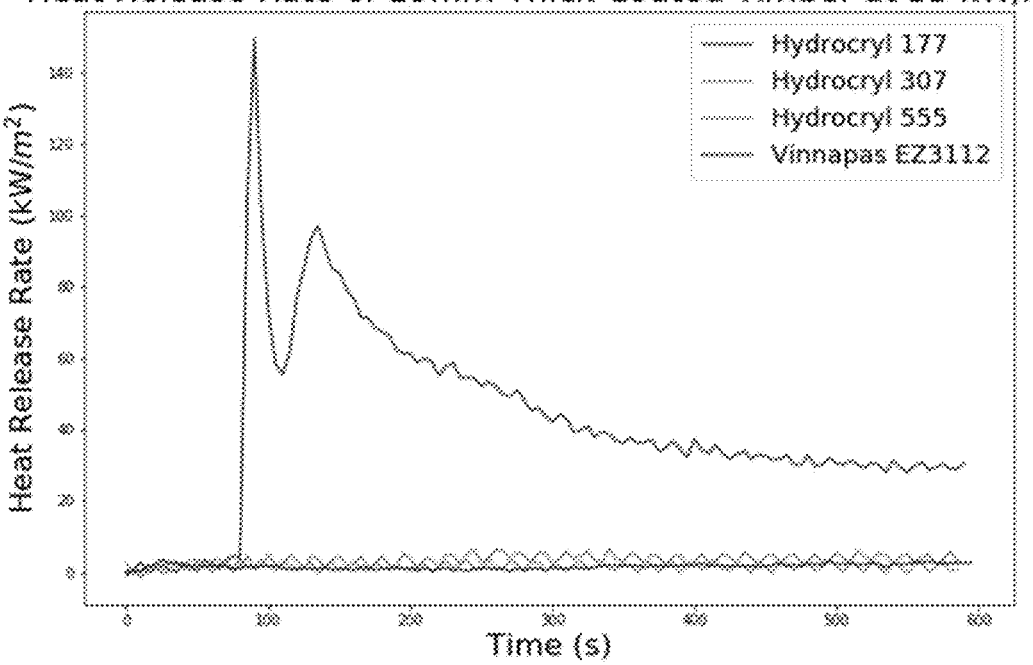
FIG. 1 shows the heat release rate (HRR) profiles for fire retardant coatings containing Hydrocryl and Vinnapas® polymeric binders; the upper trace is for Hydrocryl 177, and the remaining three lower traces are for the other binders tested.

It will be understood that the disclosure described and defined in this specification extends to all alternative combinations of two or more of the individual features mentioned or evident from the text or drawings. All of these different combinations constitute various alternative aspects of the disclosure.

Definitions

For purposes of interpreting this specification, terms used in the singular will also include the plural and vice versa.

As used herein, except where the context requires otherwise, the term "comprise" and variations of the term, such as "comprising", "comprises" and "comprised", are not intended to exclude further additives, components, integers or steps.

"About" as used herein when referring to a measurable value such as an amount, a temporal duration, and the like, is meant to encompass variations of ±20% or +10%, in some instances ±5%, in some instances 1%, and in some instances ±0.1% from the specified value, as such variations are appropriate to perform the disclosed methods.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The present disclosure relates to fire retardant paint compositions comprising polymeric binders, polyphosphate salts, nitrogen containing blowing agents, and charring agents in water. When applied to substrates the paint compositions form durable coatings useful in protecting the substrates from fire.

The present disclosure provides a fire retardant paint composition comprising:

a) about 8 to about 20 wt. % of one or more polymeric binders derived from vinyl ester monomer;

b) about 15 to about 35 wt. % of one or more polyphosphate salts;

c) about 20 to about 40 wt. % water;

d) about 5 to about 15 wt. % of one or more nitrogen containing blowing agents; and e) about 5 to about 15 wt. % of one or more charring agents;

based on the total weight percent of the paint composition.

In some preferred embodiments, the one or more polymeric binders derived from vinyl ester monomer is a vinyl acetate, ethylene, vinyl ester terpolymer. The vinyl ester monomer is a different vinyl ester monomer to vinyl acetate.

In embodiments the fire retardant paint composition comprises:

a) about 10 to about 18 wt. % of one or more polymeric binders derived from vinyl ester monomer;

b) about 20 to about 30 wt. % of one or more polyphosphate salts;

c) about 25 to about 35 wt. % water;

d) about 5 to about 15 wt. % of one or more nitrogen containing blowing agents; and e) about 5 to about 15 wt. % of one or more charring agents;

based on the total weight percent of the paint composition.

In some preferred embodiments, the one or more polymeric binders derived from vinyl ester monomer is a vinyl acetate, ethylene, vinyl ester terpolymer. The vinyl ester monomer is a different vinyl ester monomer to vinyl acetate.

Typically, the water content of the presently disclosed paint compositions is from about 10 to 40 wt. %, or from about 25 to about 35 wt. %, based on the total weight of the paint composition.

The present disclosure also provides a fire retardant coating, wherein the coating comprises:

a) about 12 to about 30 wt. % of one or more polymeric binders derived from vinyl ester monomer;

b) about 20 to about 50 wt. % of one or more polyphosphate salts;

c) about 5 to about 20 wt. % of one or more nitrogen containing blowing agents; and d) about 5 to about 20 wt. % of one or more charring agents;

based on the total weight percent of the coating.

In some preferred embodiments, the one or more polymeric binders derived from vinyl ester monomer is a vinyl acetate, ethylene, vinyl ester terpolymer. The vinyl ester monomer is a different vinyl ester monomer to vinyl acetate.

In embodiments, the fire retardant coating comprises:

a) about 15 to about 25 wt. % of one or more polymeric binders derived from vinyl ester monomer;

b) about 30 to about 40 wt. % of one or more polyphosphate salts;

c) about 8 to about 18 wt. % of one or more nitrogen containing blowing agents; and d) about 8 to about 18 wt. % of one or more charring agents;

based on the total weight percent of the coating.

In some preferred embodiments, the one or more polymeric binders derived from vinyl ester monomer is a vinyl acetate, ethylene, vinyl ester terpolymer. The vinyl ester monomer is a different vinyl ester monomer to vinyl acetate.

The fire retardant coatings result when the fire retardant paint compositions are applied to a substrate and subsequently dry. Accordingly, the coatings have a low water content, typically less than about 5 wt. %, or less than about 4 wt. %, or less than about 3 wt. %, or less than about 2 wt. %, or less than about 1 wt. %, or less than about 0.5 wt. %, or less than about 0.2 wt. %

In embodiments, the fire retardant coatings have less than about 0.2 wt. % water content.

Polymeric Binder

The polymeric binder serves to bind the components of the paint composition when coated on a substrate. It also serves to adhere the coating to the substrate.

In embodiments, the one or more polymeric binders derived from vinyl ester monomer is an ethylene vinyl ester copolymer or an acrylic vinyl ester copolymer In embodiments, the vinyl ester monomer comprises vinyl acetate monomer.

In some preferred embodiments, the one or more polymeric binders derived from vinyl ester monomer is a vinyl acetate, ethylene, vinyl ester terpolymer. The vinyl ester monomer is a different vinyl ester to vinyl acetate. Other suitable vinyl ester monomers include vinyl propionate and vinyl laurate.

In embodiments, the amount of one or more polymeric binders in the fire retardant paint composition is about 8 wt. % to about 20 wt. %, or about 10 wt. % to about 18 wt. %, or about 12 wt. % to about 16 wt. %, based on the total weight of the fire retardant paint composition.

In embodiments, the amount of one or more polymeric binders in the fire retardant coating is about 8 wt. % to about 20 wt. %, or about 10 wt. % to about 18 wt. %, or about 12 wt. % to about 16 wt. %, based on the total weight of the fire retardant coating.

Polyphosphate Salt

Polyphosphate salt fire retardants may include ammonium polyphosphate (Type II) or melamine polyphosphate.

In embodiments, the one or more polyphosphate salts may have a solubility in water of less than 1 wt. % at 20° C., or less than 0.5 wt. % at 20° C.

In embodiments, the one or more polyphosphate salts comprise a particulate polyphosphate having an average particle size (D50) of 5 to 50 micron, preferably 10 to 30 micron. The average particle size may be determined by, for example, laser diffraction.

The amount of polyphosphate salt in the fire retardant paint composition is about 15 wt. % to about 35 wt. %, or about 20 wt. % to about 30 wt. %, based on the total weight of the fire retardant paint composition.

The amount of polyphosphate salt in the fire retardant coating is about 20 wt. % to about 50 wt. %, or about 30 wt. % to about 40 wt. %, based on the total weight of the fire retardant coating.

Nitrogen Containing Blowing Agent

In embodiments, the one or more nitrogen containing blowing agents decompose at a temperature from about 250° C. to about 400° C.

In embodiments, the one or more nitrogen containing blowing agents comprises melamine, urea, melamine cyanurate, dicyandiamide, guanidine and glycine.

The amount of nitrogen containing blowing agent in the fire retardant paint composition is about 5 wt. % to about 15 wt. %, or about 7 wt. % to about 12 wt. %, based on the total weight of the fire retardant paint composition.

The amount of nitrogen containing blowing agent in the fire retardant coating is about 5 wt. % to about 15 wt. %, or about 8 wt. % to about 18 wt. %, or about 10 wt. % to about 16 wt. %, based on the total weight of the fire retardant coating.

Charring Agent

In embodiments, the one or more charring agents comprise one or more polyols.

In embodiments, the one or more polyols comprise one or more of glycerol, pentaerythritol, and dipentaerythritol.

In embodiments, the one or more polyols comprise dipentaerythritol.

The amount of charring agent in the fire retardant paint composition is about 5 wt. % to about 15 wt. %, or about 7 wt. % to about 12 wt. %, based on the total weight of the fire retardant paint composition.

The amount of charring agent in the fire retardant coating is about 5 wt. % to about 15 wt. %, or about 8 wt. % to about 18 wt. %, or about 10 wt. % to about 16 wt. %, based on the total weight of the fire retardant coating.

Inorganic Fillers

In embodiments, the fire retardant paint composition and coating further comprises one or more inorganic fillers in an amount from about 3 to about 15 wt. %, based on the total weight percent of the paint composition or coating.

In embodiments, the amount of inorganic filler is from about 5 to about 10 wt. %.

In embodiments, the one or more inorganic fillers comprise one or more of titanium dioxide, zinc oxide, aluminium hydroxide, magnesium hydroxide, silica, silicates, and calcium carbonate.

In embodiments, the one or more inorganic fillers comprise titanium dioxide.

Char Strengthening Enhancer

In embodiments, the fire retardant paint composition or coating further comprises one or more char strengthening enhancers in an amount from about 0.5 to about 5 wt. %, based on the total weight percent of the paint composition or coating, or from about 1.0 to about 3 wt. %.

In embodiments, the one or more char strengthening enhancers comprise one or more of rockwool, glass fibre, carbon fibre, silicon carbide fibre, carbon nanotubes, and halloysite nanotubes.

Auxiliaries

In embodiments, the fire retardant paint composition or coating further comprises one or more auxiliaries selected from UV resistance additives, dispersing agents, biocides, wetting agents, defoamers, coalescents, and thickeners.

Suitable dispersing agents include, for example, Disperbyk® 2080, a modified styrene maleic acid copolymer. Other dispersing agents known in the art are contemplated.

The amount of dispersing agents present in the fire retardant paint composition or coating is typically less than about 3 wt. %, or about 0.5 wt. % to about 1 wt. %, based on the total weight of the fire retardant paint composition or coating.

Suitable biocides include, for example, biocides such as Acticide® FS(N) or HF. Other biocides known in the art are contemplated.

The amount of biocide present in the fire retardant paint composition or coating is typically less than about 2 wt. %, or about 0.05 wt. % to about 0.3 wt. %, based on the total weight of the fire retardant paint composition or coating.

Suitable wetting agents include, for example, polyether modified polysiloxane such as BYK 346 or Additol® VXW 6503N. Other wetting agents known in the art are contemplated.

The amount of wetting agent present in the fire retardant paint composition or coating is typically less than about 3 wt. %, or about 0.3 wt. % to about 1.0 wt. %, based on the total weight of the fire retardant paint composition or coating.

Suitable defoamers include, for example, silicone containing defoamers, such as BYK-1780. Other defoamers known in the art are contemplated.

The amount of defoamer present in the fire retardant paint composition or coating is typically less than about 3 wt. %, or about 0.2 wt. % to about 0.7 wt. %, based on the total weight of the fire retardant paint composition or coating.

Suitable thickeners include, for example, polyurethane solution, such as Rheobyk-H 6500 VF, or cellulose ethers. Other thickeners known in the art are contemplated.

The amount of thickener present in the fire retardant paint composition or coating is typically less than about 3 wt. %, or about 0.5 wt. % to about 2 wt. %, based on the total weight of the fire retardant paint composition or coating.

Suitable coalescents include, for example, ester alcohols. Other coalescents known in the art are contemplated.

The amount of coalescent present in the fire retardant paint composition or coating is typically less than about 5 wt. %, or about 2 wt. % to about 4 wt. %, based on the total weight of the fire retardant paint composition or coating.

Method of Preparing the Fire Retardant Paint Compositions

The presently disclosed fire retardant paint compositions may be prepared by combining one or more polymeric binders, one or more polyphosphate salts, one or more nitrogen blowing agents, one or more charring agents, one or more inorganic fillers (if present), one or more char strengthening enhancers (if present), one or more auxiliaries (if present) and water.

Preferably, after combining, the composition is subjected to high shear mixing.

Use of the Fire Retardant Paint Compositions

There is also provided a method of protecting a substrate against fire comprising the step of coating the substrate with the fire retardant paint composition according to any one of the herein disclosed embodiments.

In embodiments, the substrate is coated by means of spraying or brushing.

In embodiments, the substrate is timber, particularly interior timber.

In embodiments, the substrate is plasterboard.

There is also provided the use of the fire retardant composition according to any one of the herein disclosed embodiments in protecting a substrate against fire.

Coated Substrates

There is provided a coated substrate wherein the coating comprises the fire retardant paint coating according to any one of the herein disclosed embodiments and the coating is in direct contact with the substrate.

In embodiments, the substrate is timber, brick, concrete, plasterboard or metal. In such embodiments the fire retardant coating according to the present disclosure is in direct contact with the timber, brick, concrete, plasterboard, or metal.

In embodiments, the coating has a thickness from about 0.2 mm to about 3 mm.

In embodiments, the adhesion strength of the coating to the substrate is greater than 0.5 MPa for a coating thickness of 0.5 mm.

There is also provided a coated substrate wherein the coating comprises a multilayer structure said multilayer structure comprising:

an optional first layer comprising a paint composition in contact with the substrate;

a second layer disposed atop the substrate or the first layer, said second layer comprising the coating according to any one of the herein disclosed embodiments; and an optional third layer disposed atop the second layer, said third layer comprising a paint composition;

wherein one or both the first and third layers are present.

In embodiments, the first layer is a primer layer.

In embodiments, the third layer comprises paint.

In embodiments, the second layer has a thickness from about 0.2 mm to about 3 mm.

In embodiments, the adhesion strength of the second layer to the substrate or the first layer is greater than 0.5 MPa, for a second layer thickness of 0.5 mm.

Advantageously it has been found that the fire retardant coating of the present disclosure strongly adheres to not only an untreated substrate, such as timber, brick, concrete, plasterboard, or metal, but also to substrates pretreated with another coating, such as a primer.

EXAMPLES

Analysis Techniques

Fire Resistance

Fire resistance of the fire retardant coating was rapidly assessed by using an open flame test with a butane torch. The fire retardant paint composition was first applied onto a substrate, which can be galvanised steel or *radiata* pine timber. After the paint composition had dried, it was then vertically mounted, and the torch set at 4 cm distance from the coated surface. The maximum back temperature of the sample was monitored using a handheld thermal camera (FLIR E96), and the char expansion visually observed.

Fire resistance performance of the coating was quantitatively assessed using a cone calorimeter test with a horizontal sample orientation according to AS 3837/ISO 5660. The incident heat flux varied between 25-50 kW/m², and the test was typically performed for 10 minutes. The outputs of the test included heat release rate (HRR), total heat rate (THR), and smoke production.

Coating Durability

The coatings were sequentially exposed to UV radiation and condensation using a QUV Accelerated Weathering Tester according to ASTM G154 Table X2.1 Cycle 1 exposure condition, as set out below in Table 1. The length of the exposure cycle varied between 100 and 1000 hours.

TABLE 1

| Lamp | Irradiance | Exposure Cycle |
|------|-----------|----------------|
| UVA-340 | 0.89 W/(m² · nm) | 8 h UV at 60 (±3) ° C. Black Panel Temperature |
| | | 4 h Condensation at 50 (±3) ° C. Black Panel Temperature |

The coatings before and after the radiation and condensation exposure were compared in terms of visual appearance, adhesion strength, and fire performance.

Adhesion Strength

The adhesion strength of fire retardant paint coatings was measured using a Pull-off Adhesion tester (Automatic Positest AT-A) according to ASTM D4541-09, which is widely used for measuring adhesion of coatings to wood, metal, concrete and other rigid substrates.

Materials

Table 2 collects the details of polymeric binders utilised in the examples.

TABLE 2

| Binder | Description | Solid Content (wt. %) |
|--------|-------------|------------------------|
| Hydrocryl 177 | Acrylic polymer | 47 |
| Hydrocryl 307 | Acrylic polymer | 47 |
| Hydrocryl 555 | Vinyl acetate acrylic copolymer | 55 |
| Vinnapas ® EZ3112 | Vinyl acetate, ethylene, vinyl ester, terpolymer | 49-51 |
| Oxirez AA261-G | Acrylic Veova copolymer | 49-51 |
| Oxirez EP50U | Butyl acrylate, methyl methacrylate, functional monomer, terpolymer | 49-51 |
| Accropol ™ 63-893 | Vinyl acetate acrylic copolymer | 55 |

Ammonium polyphosphate (Exolit® AP422) was sourced from Clariant. Melamine was sourced from Sigma Aldrich. Pentaerythritol was sourced from Sigma Aldrich. Dipentaerythritol (Charmor® DP40) was sourced from Ixom, Mineral fibre was Lapinus® CF10 and was sourced from Lapinus. Titanium dioxide was sourced from Tronox.

Example 1

A series of fire retardant paint compositions using the polymeric binders Hydrocryl 177, 307 and 555 and Vinnapas® EZ3112 were formulated according to Table 3 and tested using a cone calorimeter with an incident heat flux of 35 kW/m². The compositions were applied to 19 mm-thick radiata pine timber at a dry coating thickness of 0.4 mm and tested over a period of 10 minutes. Table 3 contains the weight percent of each component both as the paint composition and as the dry coating.

TABLE 3

| Component | wt % (paint) | wt. % (dry coating) |
|-----------|--------------|---------------------|
| Water | 31.0 | 0 |
| Polymeric Binder (solid content) | 14.7 | 21.4 |
| Ammonium polyphosphate | 25.1 | 36.4 |
| Dipentaerythritol | 8.1 | 11.7 |
| Melamine | 8.9 | 12.9 |
| TiO₂ | 7.4 | 10.7 |
| Lapinus | 1.6 | 2.3 |
| Auxiliaries | 3.2 | 4.6 |
| Ratio | 2.9 | 2.9 |

Figure 2:
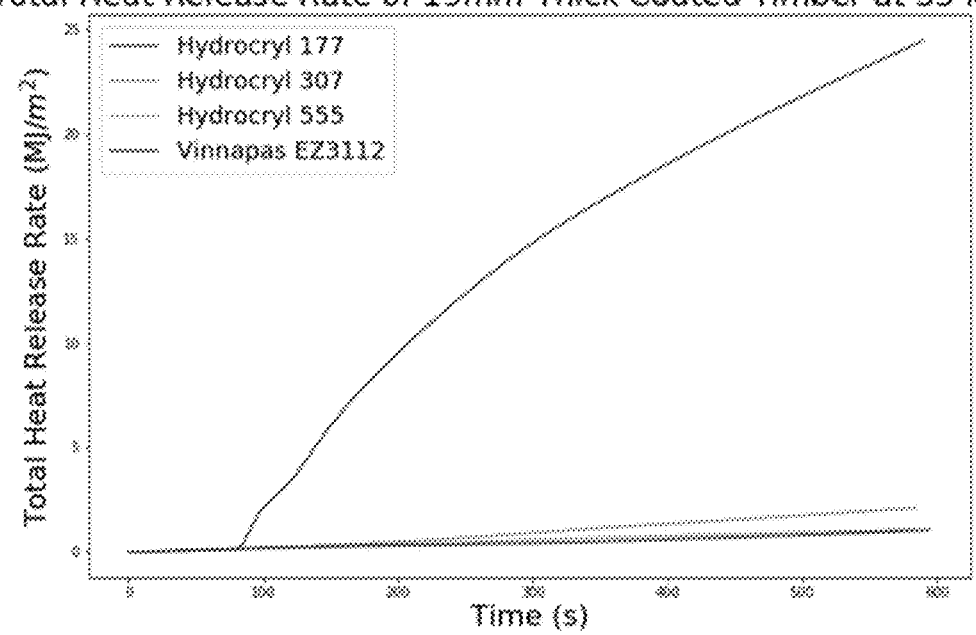
FIG. 2 shows the total heat release (THR) profiles for fire retardant coatings containing Hydrocryl and Vinnapas® polymeric binders; the upper trace is for Hydrocryl 177, and the remaining three lower traces are for the other binders tested.
Figure 3:
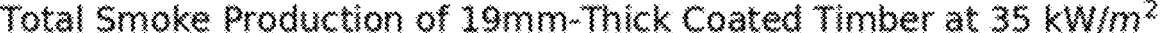
FIG. 3 shows the total smoke production (TSR) profiles for fire retardant coatings containing Hydrocryl and Vinnapas® polymeric binders. The profiles, from top to bottom are Hydrocryl 307, Hydrocryl 177, Hydrocryl 155, and Vinnapas® EZ3112.
Figure 3:
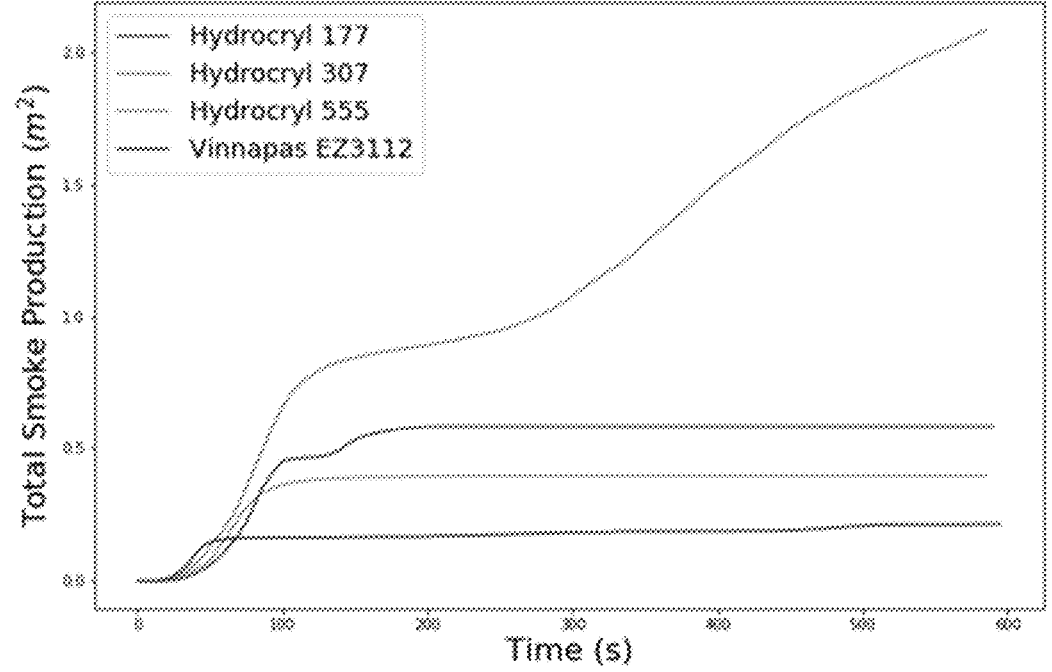

Ratio = weight ratio of the sum of ammonium polyphosphate, melamine and dipentaerythritol relative to polymeric binder The fire performance of these compositions is summarised in Table 4 and FIGS. 1 to 3.

TABLE 4

| Polymeric Binder | pHRR (kW/m²) | THR (MJ/m²) | Time to Ignition (s) | FIGRA (W/s) | SMOGRA (m²/s²) |
|------------------|--------------|-------------|----------------------|-------------|-----------------|
| Hydrocryl 177 | 149.4 | 24.5 | 90 | 1660.3 | 0.16 |
| Hydrocryl 307 | 6.64 | 2.1 | 0 | 27.1 | 0.14 |
| Hydrocryl 555 | 3.94 | 1.1 | 0 | 49.2 | 0.16 |
| Vinnapas ® EZ3112 | 3.67 | 1.0 | 0 | 91.7 | 0.18 | pHRR = peak heat release rate
THR = total heat release
FIGRA = fire growth rate index
SMOGRA = smoke growth rate index The coating containing Hydrocryl 177 gave the poorest fire performance with a a much higher peak HRR of 150 kW/m² and FIGRA value of 1660 W/s. The coatings containing Vinnapas® EZ3112 and Hydrocryl 307 had the lowest peak HRR.

FIG. 1 shows the heat release rates and FIG. 2 the total heat release rate. FIG. 3 shows the total smoke production and indicates the coating containing Vinnapas® EZ3112 binder had the lowest total smoke production.

Figure 4:
FIG. 4 contains photographs of char formation and expansion of fire retardant coatings containing Vinnapas® EZ3112 (FIG. 4(a) left hand panel), Hydrocryl 177 (Figure (4(a) right hand panel), Hydrocryl 307 (FIG. 4(b) left hand panel), and Hydrocryl 555 (FIG. 4(b) right hand panel) polymeric binders.
Figure 4:
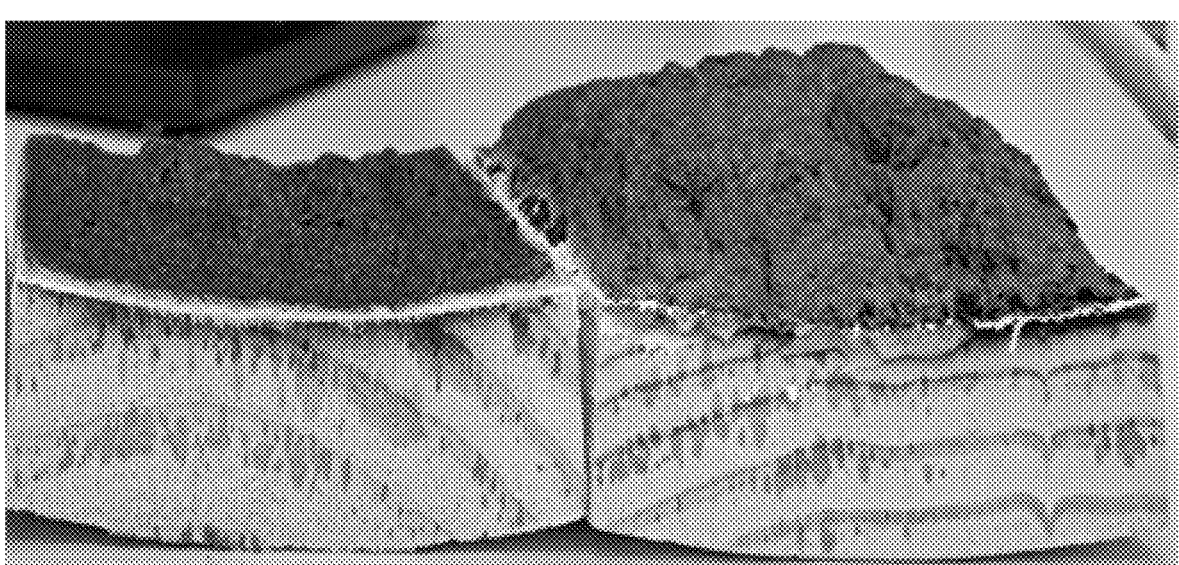

The char formation and expansion of the coatings are shown in FIG. 4. The coatings containing Vinnapas® EZ3112 (FIG. 4(a) left hand panel) and Hydrocryl 555 (FIG. 4(b) right hand panel) exhibited the best fire performance, as illustrated by the thick, expanded char layer which protected the wooden substrate. Both Hydrocryl 177 (Figure (4(a) right hand panel) and Hydrocryl 307 (PCT 4(b) left hand panel) both produced much less char expansion.

Figure 5:
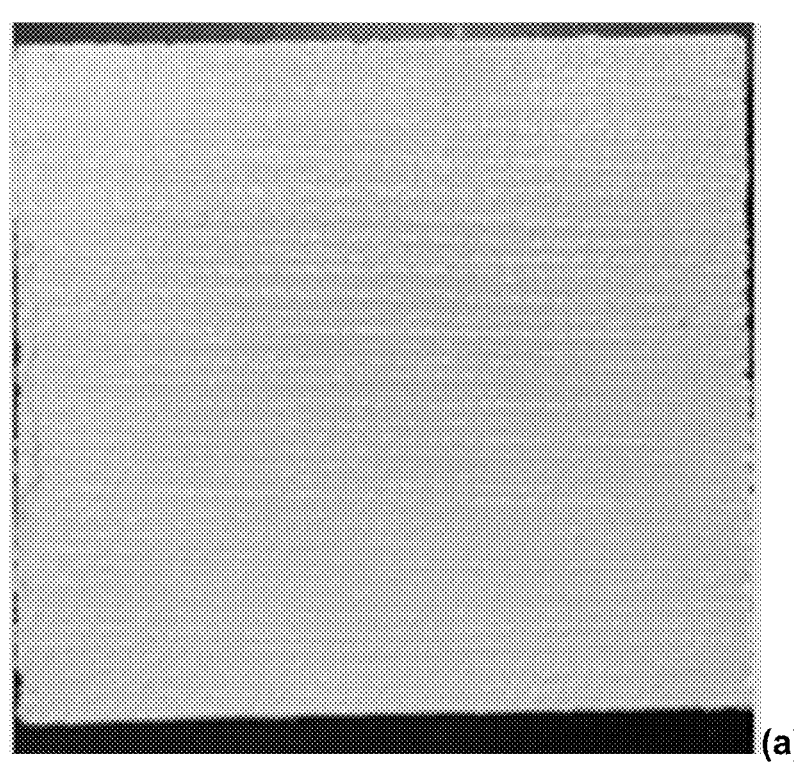
FIG. 5 contains photographs of fire retardant coatings after accelerated weathering, containing Vinnapas® EZ3112 (FIG. 5(a)) and Hydrocryl 555 (FIG. 5(b)), polymeric binders.
Figure 5:
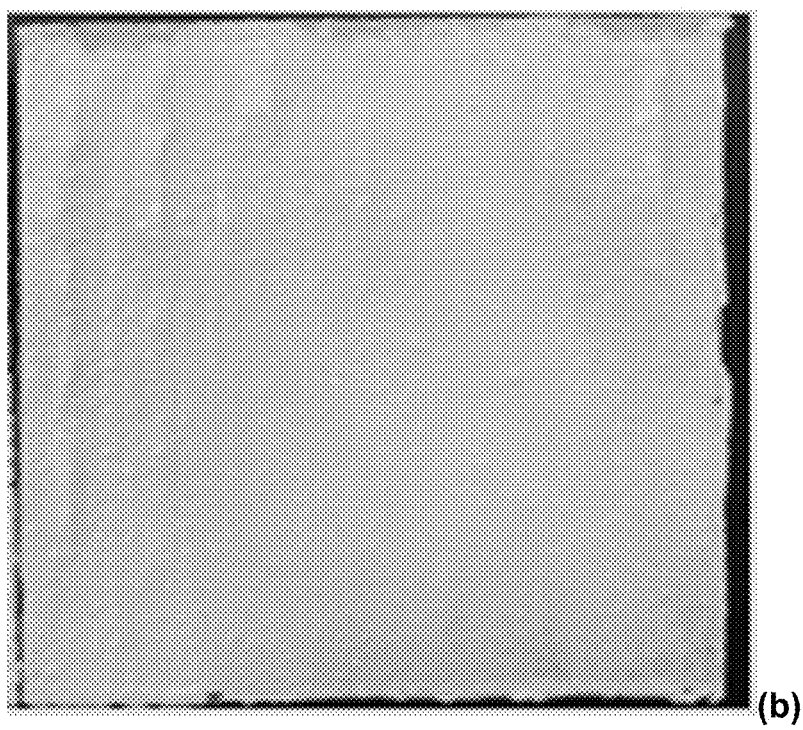

However, after accelerated weathering, Hydrocryl 555 failed to perform because of film defects as shown in FIG. 5(b). In contrast, the coatings prepared with the other polymeric binders showed little change after accelerated weathering. FIG. 5(a) is an example of a durable coating with Vinnapas® EZ3112 after accelerated weathering.

In summary, coatings containing Vinnapas® EZ3112 polymeric binder gave the best balance of fire performance and durability.

Example 2: Charring Agent

The paint composition in Table 3 with Vinnapas® EZ3112 binder was used to compare the performance between pentaerythritol and dipentaerythritol as charring agent. The compositions were applied to a substrate and tested before and after accelerated weathering. The coating with pentaerythritol performed very poorly after weathering, whereas the composition with dipentaerythritol maintained good performance after weathering. Furthermore, pentaerythritol easily leached out of the coating, even after 24 hours of weathering, in contrast to dipentaerythritol which showed little indication of leaching. The composition containing pentaerythritol showed significantly deteriorated performance after accelerated weathering with low char formation due to lack of carbon source.

Example 3: Testing of Alternative Polymeric Binders

Formulations similar to those in Table 3 were prepared using alternate binders Oxirez AA261-G and Oxirez EP50U. The coating thickness was 0.4 mm. However, these binders performed poorly in comparison to Vinnapas® EZ3112, showing lower char expansion and therefore unacceptable fire performance.

Figure 6:
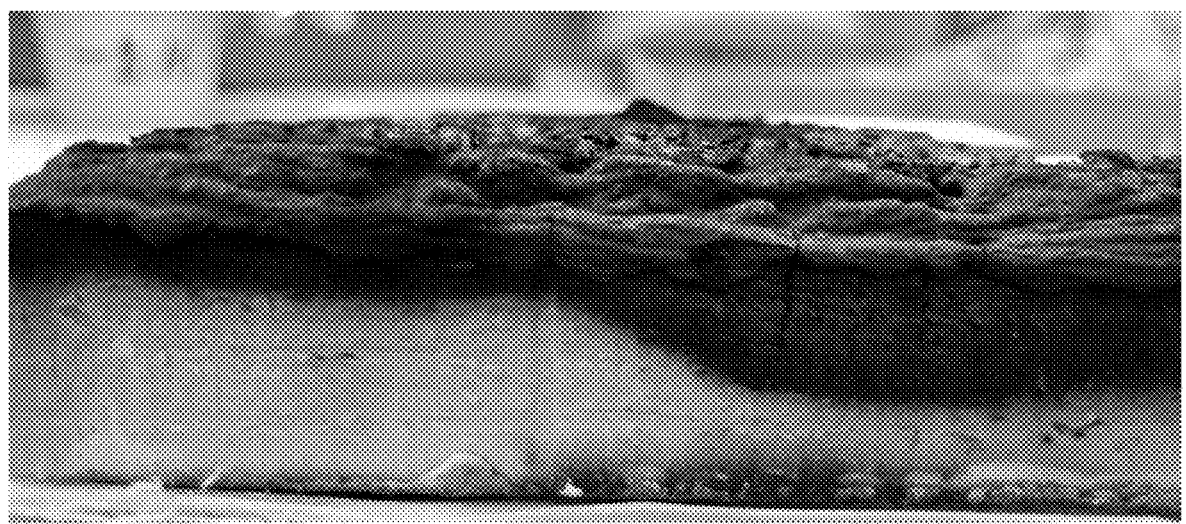
FIG. 6 contains photographs of char formation and expansion of fire retardant coatings containing Oxirez AA261-G (FIG. 6(a)) and Oxirez EP50U (FIG. 6(b)) polymeric binders.
Figure 6:
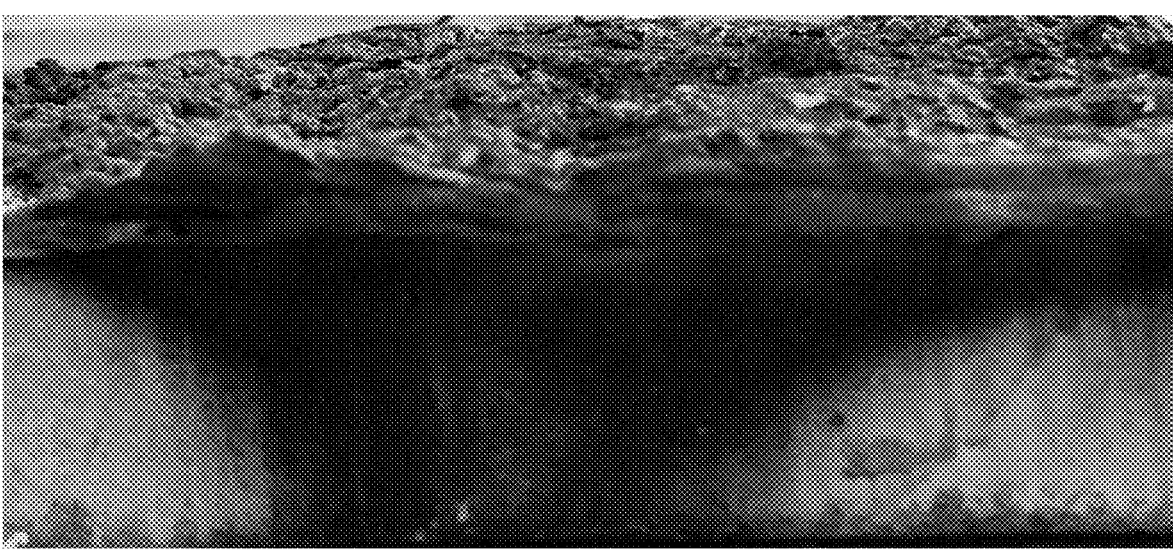

FIGS. 6(a) and (b) illustrate the relatively poor char formation with, respectively, Oxirez AA261-G and Oxirez EP50U polymeric binders. The thin char layer compared to coatings prepared with Vinnapas® EZ3112 (FIG. 4(a)) is evident. Of particular note is burnt timber substrate below the char layer, which is not present in FIG. 4(a).

Example 4: Interactions Between IFR Components, Inorganic Filler, and Polymeric Binder A design of experiments in Table 5 was used to determine the interaction between intumescent fire-retardant additives (IFR) comprising APP, melamine and dipentaerythritol with $TiO_2$ inorganic filler and Acropol™ 63-893 polymeric binder. These experiments were used to determine the effect of increasing/decreasing one component on the overall coating performance in terms of char expansion and thermal insulation, as well as the coating adhesion. A desirable combination should yield the highest char expansion factor and coating adhesion and the lowest maximum temperature.

Open flame tests were performed by coating the compositions onto galvanised steel.

16 than those of ITR-1, 2 and 3, indicating that superior adhesion of the coating can be achieved without compromising insulating properties. Further, moderating the amount of inorganic filler (titanium dioxide) appeared to moderate the maximum temperature.

While Acropol™ 63-893 polymeric binder performed well in the flame test before weathering, after accelerated weathering for 1000 hrs it performed poorly.

The invention claimed is:

1. A fire retardant paint composition comprising:
   a) about 8 to about 20 wt. % of a terpolymer comprising vinyl acetate, ethylene, and vinyl ester;
   b) about 15 to about 35 wt. % of one or more polyphosphate salts having a solubility in water of less than about 2 wt. % at 20° C.;
   c) about 20 to about 40 wt. % water;
   d) about 5 to about 15 wt. % of melamine as a blowing agents; and
   e) about 5 to about 15 wt. % of dipentaerythritol as a charring agent; based on a total weight percent of the paint composition.

2. The fire retardant paint composition according to claim 1, comprising:
   a) about 10 to about 18 wt. % of the terpolymer comprising vinyl acetate, ethylene, and vinyl ester;
   b) about 20 to about 30 wt. % of one or more polyphosphate salts having a solubility in water of less than about 2 wt. % at 20° C.;
   c) about 25 to about 35 wt. % water;
   d) about 5 to about 15 wt. % of melamine as a blowing agent; and
   e) about 5 to about 15 wt. % of dipentaerythritol as a one or more charring agent;
   based on the total weight percent of the paint composition.

3. The fire retardant paint composition according to claim 1, further comprising one or more inorganic fillers in an amount from about 3 to about 15 wt. %, based on the total weight percent of the paint composition.

4. The fire retardant paint composition according to claim 1, further comprising one or more char strengthening enhancers in an amount from about 0.5 to about 5 wt. %, based on the total weight percent of the paint composition.

TABLE 5

| Sample name | Composition | | | | Coating thickness (mm) | Max Temp (° C.) | Max char thickness (cm) | Adhesion pull-off (MPa) | Expansion factor |
| | IFR (g) | TiO₂ (g) | Binder (g) | Ratio | | | | | |
|---|---|---|---|---|---|---|---|---|---|
| ITR-1 | 25 | 5 | 5.5 | 4.5 | 0.45 | 297.1 | 0.60 | 0.51 | 13.3 |
| ITR-2 | 35 | 5 | 5.5 | 6.4 | 0.35 | 272.7 | 0.65 | 0.31 | 18.6 |
| ITR-3 | 25 | 10 | 5.5 | 4.5 | 0.30 | 357.4 | 0.45 | 0.53 | 15.0 |
| ITR-4 | 35 | 10 | 5.5 | 6.4 | 0.35 | 292.2 | 1.15 | 0.39 | 32.9 |
| ITR-5 | 25 | 5 | 10 | 2.5 | 0.38 | 467.3 | 0.20 | 1.33 | 5.3 |
| ITR-6 | 35 | 5 | 10 | 3.5 | 0.35 | 349.8 | 0.50 | 0.75 | 14.2 |
| ITR-7 | 25 | 10 | 10 | 2.5 | 0.40 | 632.9 | 0.10 | 1.10 | 2.5 |
| ITR-8 | 35 | 10 | 10 | 3.5 | 0.30 | 583.4 | 0.44 | 0.82 | 14.7 |

Ratio = weight ratio of the sum of ammonium polyphosphate, melamine and polyol relative to polymeric binder It can be seen that sample ITR-6 which has a ratio of ITR to polymeric binder of 3.5 gave an excellent balance of adhesion strength, maximum temperature and char expansion factor. In contrast, samples, ITR-2 and ITR-4, which have a ratio of ITR to polymeric binder of 6.4 had very poor adhesion strength. It is surprising that the maximum temperature observed with sample ITR-6 was not much higher 5. The fire retardant paint composition according to claim 1, further comprising one or more auxiliaries selected from UV resistance additives, dispersing agents, biocides, wetting agents, defoamers, coalescents, and thickeners.

6. The fire retardant paint composition according to claim 1, wherein the one or more polyphosphate salts comprise one or more of alkali metal polyphosphate, ammonium polyphosphate and melamine polyphosphate.

7. The fire retardant paint composition according to claim 1, wherein the one or more polyphosphate salts has a solubility in water of less than about 1 wt. %, at 20° C.

8. The fire retardant paint composition according to claim 3, wherein the one or more inorganic fillers comprise one or more of titanium dioxide, zinc oxide, aluminium hydroxide, magnesium hydroxide, silica, silicates, and calcium carbonate.

9. The fire retardant paint composition according to claim 4, wherein the one or more char strengthening enhancers comprise one or more of rockwool, glass fiber, carbon fiber, silicon carbide fiber, carbon nanotubes, and halloysite nanotubes.

10. A fire retardant paint composition according to claim 1, comprising:
   a) about 8 to about 20 wt. % of the terpolymer comprising vinyl acetate, ethylene, and vinyl ester;
   b) about 15 to about 35 wt. % of one or more polyphosphate salts having a solubility in water of less than about 2 wt. %;
   c) about 20 to about 40 wt. % water;
   d) about 5 to about 15 wt. % of melamine;
   e) about 5 to about 15 wt. % of dipentaerythritol; and
   f) about 3 to about 15 wt. % of titanium dioxide. based on the total weight percent of the paint composition.

11. A method of protecting a substrate against fire comprising the step of applying the fire retardant paint composition according to claim 1 to the substrate.

12. The method according to claim 11, wherein the applying comprises brushing or spraying.

13. The method according to claim 11, wherein the substrate comprises timber, brick, concrete, metal, or plasterboard.

14. The method according to claim 13, wherein the timber is interior timber.

15. The fire retardant paint composition according to claim 1, wherein a weight ratio of a sum of polyphosphate salt, melamine, and dipentaerythritol, to the terpolymer comprising vinyl acetate, ethylene, and vinyl ester is less than about 5.

16. The fire retardant paint composition according to claim 1, wherein a weight ratio of a sum of polyphosphate salt, melamine and dipentaerythritol, to the terpolymer comprising vinyl acetate, ethylene, and vinyl ester is from about 5 to about 2.

17. The fire retardant paint composition according to claim 3, wherein a weight ratio of the terpolymer comprising vinyl acetate, ethylene, and vinyl ester to one or more inorganic fillers is greater than 1.

18. The fire retardant paint composition according to claim 1, wherein the terpolymer comprises more than one terpolymer.

* * * * *